United States Patent [19]

Sakurai

[11] Patent Number: 4,586,652
[45] Date of Patent: May 6, 1986

[54] AIR CONDITIONER SYSTEM FOR AUTOMOBILES

[75] Inventor: Yoshihiko Sakurai, Konan, Japan

[73] Assignee: Diesel Kiki Co., Ltd., Tokyo, Japan

[21] Appl. No.: 735,204

[22] Filed: May 17, 1985

[30] Foreign Application Priority Data

May 21, 1984 [JP] Japan ............................... 59-101892

[51] Int. Cl.⁴ .......................................... G05D 23/13
[52] U.S. Cl. ..................... 236/13; 62/244;
    98/2.01; 165/12; 165/22; 165/43
[58] Field of Search .......................... 236/13; 62/244;
    98/2.01; 165/12, 22, 42, 43

[56] References Cited

U.S. PATENT DOCUMENTS

| | | | |
|---|---|---|---|
| 4,289,195 | 9/1981 | Bellot et al. | 165/12 |
| 4,340,112 | 7/1982 | Sutoh et al. | 165/42 X |
| 4,407,354 | 10/1983 | Takishita et al. | 165/42 |
| 4,460,036 | 7/1984 | Yoshimi et al. | 98/2.05 X |
| 4,478,274 | 10/1984 | Naganoma et al. | 62/244 X |
| 4,482,009 | 11/1984 | Nishimura et al. | 98/2.01 X |

Primary Examiner—William E. Tapolcai
Attorney, Agent, or Firm—Wenderoth, Lind & Ponack

[57] ABSTRACT

An air conditioner system for a vehicle includes a rear-seat blower unit and a rear-seat blower unit which are connected only by at least two connecting passages. Thus the air conditioner system is simple in structure and hence easy to construct. Further, any existing front-seat air conditioner unit can be used without reconstruction. The temperature of the blown-off air is automatically adjusted in accordance with the difference between the temperature preset by the temperature setting means and the temperature detected by the rear-seat mode sensor so that the temperature in the rear-seat part of the passenger compartment can be controlled at passenger's desire, independently of the temperature of the front-seat part.

7 Claims, 7 Drawing Figures

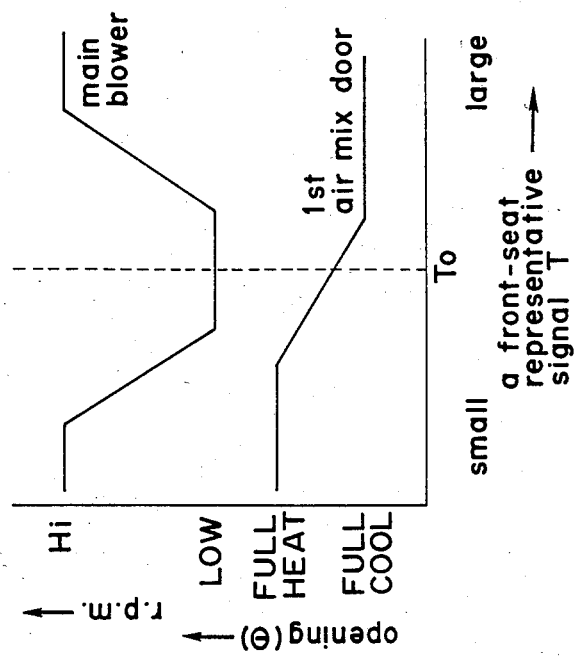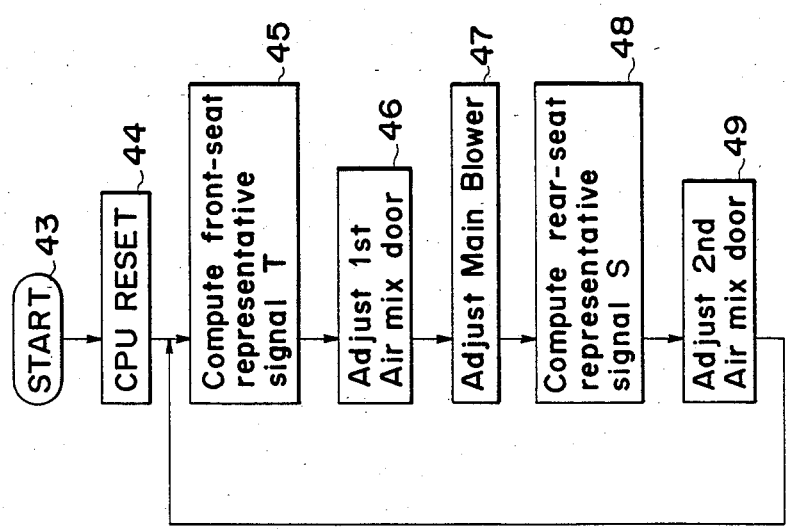

AIR CONDITIONER SYSTEM FOR AUTOMOBILES

BACKGROUND OF THE INVENTION

The present invention relates to air conditioner systems for automotive vehicles which are capable of conditioning a front-seat part and a rear-seat part, separately, of the vehicle passenger compartment. More particularly, it relates to such an air conditioner system capable of automatically controlling the temperature of air to be blown into the rear-seat part.

Japanese Utility Model Laid-Open Publication No. 57-96013 discloses a vehicle air conditioner system wherein two separate air conditioner units are disposed on the front-seat side and the rear-seat side, respectively, of the passenger compartment. The disclosed system is disadvantageous in that the front air conditioner unit is substantially useless in conditioning the rear-seat side, resulting in a wastefull air conditioner system as a whole.

In order to eliminate the foregoing drawback, there have been proposed such air conditioner systems as shown in Japanese Patent Publication No. 58-7486 and Japanese Patent Laid-Open Publication No. 57-167819. The system shown in the former publication includes a front-seat air conditioner unit wherein at least one partition wall is disposed in a main duct downstream of an evaporator to define a plurality of chambers, and heater cores are disposed in the respective chambers, air mix doors being provided in front of the respective heater cores. In the system shown in the latter publication, a heater core in a main duct is subdivided into two portions downstream of which are provided two air flow passages separated by a partition wall, and air mix doors are provided in front of the heater core portions to control the temperature of air passing through the air flow passages. The disclosed air conditioner systems include an electric controller for controlling the openings of the respective air mix doors. A drawback common to both systems is however in that the main duct is complex in structure due to a plurality of chambers disposed downstream of the heater core.

SUMMARY OF THE INVENTION

It is therefore an object of the present invention to provide an air conditioner system for vehicles which is simple in structure and is capable of automatically controlling the temperature of air to be blown into the rear-seat part, independently of the front-seat part of the passenger compartment.

According to the present invention, there is provided an air conditioner system for vehicles, comprising a front-seat air conditioner unit including a main duct opening at one end thereof to the front-seat part, and means disposed in said main duct for adjusting the amount of heat exchange; a rear-seat blower unit including a duct opening at one end thereof to the rear-seat part, and an air mix chamber defined in said duct remotely from said one end thereof; at least two connecting passages connecting said air mix chamber with said main ducts at portions thereof located, respectively, upstream and downstream of said heat exchange amount adjusting means; at least one air mix door disposed upstream of said air mix chamber and movable for adjusting the proportion of air introduced into said air mix chamber through said connecting passages; and an electric control unit operatively connected with said air mix door for controlling the position of the latter, said electric control unit including (1) temperature setting means for presetting the temperature of air to be blown into the rear-seat part, (2) a sensor for detecting the temperature of air passing through said duct, (3) computing means for computing a control signal on the basis of the difference between the preset temperature and the detected temperature, and (4) an actuator operatively connected to said air mix door and responsive to said control signal to actuate said air mix door.

Since the front-seat air conditioner unit and the rear-seat blower unit are connected only by at least two connecting passages, the air conditioner system is simple in structure and hence easy to construct. Another advantage is in that the existing front-seat air conditioner unit can be used without reconstruction. The temperature of the blown-off air is automatically adjusted in accordance with the difference between the temperature preset by the temperature setting means and the temperature detected by the rear-seat mode sensor so that the temperature in the rear-seat part of the passenger compartment can be controlled at passenger's desire, independently of the temperature of the front-seat part.

Each of said connecting passages has an outlet opening said air mix chamber, said air mix door being disposed adjacent to said outlets of said connecting passages. Alternatively, the air mix door is disposed in each of said connecting passages.

The air conditioner system includes a further connecting passage having an inlet opening to said main air mix chamber and an outlet opening to said air mix chamber.

The air conditioner system according to the invention may includes a door disposed in said duct of said rear-seat blower unit and operative to block air flow toward the rear-seat part, and a blower disposed in said duct of said rear-seat blower unit downstream of said air mix chamber, for forcing air through said duct.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 3 is a flow chart explaining the operation of a microcomputer in the control unit shown in FIG. 2;

FIG. 4 is a diagram showing performances of a main blower and a first air mix door with respect to a front-seat representative signal T;

DETAILED DESCRIPTION

The present invention will now be described in detail with reference to the illustrated embodiments.

Figure 1:
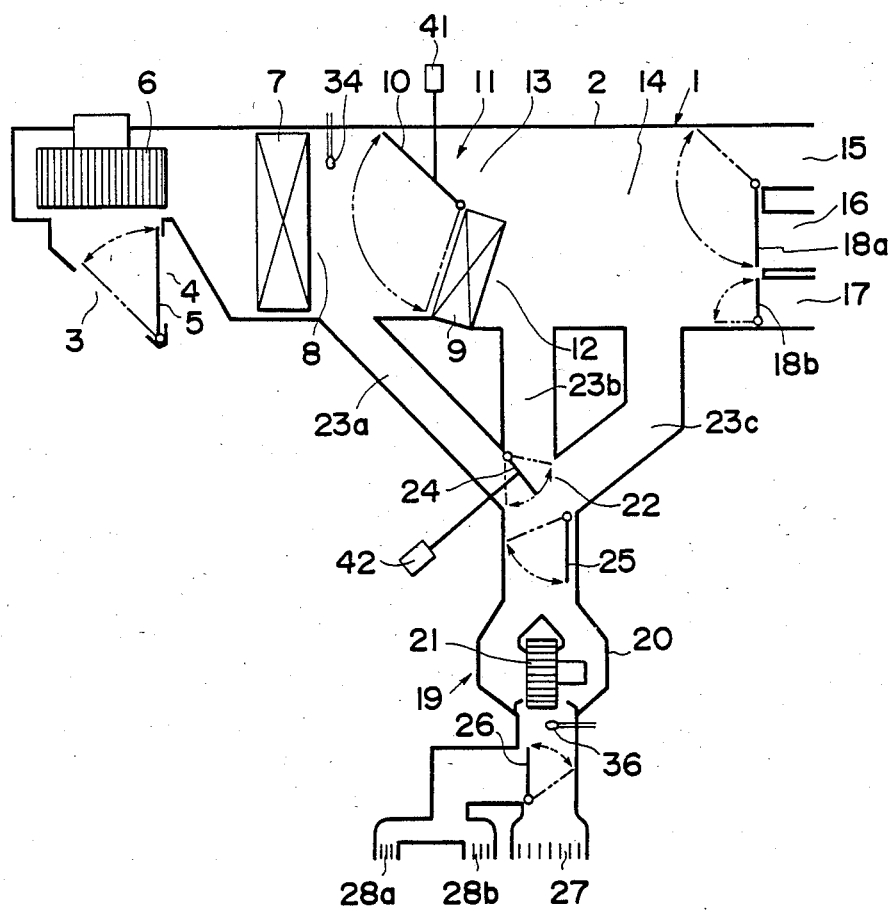
FIG. 1 is a schematic view showing a first embodiment of an air conditioner system in accordance with the present invention.

Referring to FIG. 1, there is shown a first embodiment of an air conditioner system according to the present invention. The air conditioner system comprises a front-seat air conditioner unit 1 including a main air flow duct 2 which has a recirculated air inlet 3 and an outside air inlet 4 provided in branched fashion. A door 5 is provided to select one of the inlets 3 and 4.

A main blower 6 is disposed in the main duct 2 immediately downstream of the inlets 3, 4 to force air through the duct 2 from left to right either from the recirculated air inlet 3 or the outside air inlet 4. Disposed downstream of the blower 6 is an evaporator 7 for cooling the air passing therethrough. The evaporator 7 forms a refrigerant system together with a compressor and other related components, neither not shown. The cooled air then flows through a cool air passage 8 provided downstream of the evaporator 7.

The front-seat air conditioner unit 1 further includes means 11 disposed in the main duct 2 downstream of the evaporator 7, for adjusting the amount of heat exchange. The adjusting means 11 is constituted by a heater core 9 for heating the air passing therethrough, and a first air mix door 10 for controlling the amount of air passing through the heater core 9 and thereby the temperature of the air passing through the duct 2. The heater core 9 is bypassed by a bypass passage 13 extending parallel with a hot air passage 12. With the adjusting means 11 thus constructed, the ratio of the amount or proportion of heated air passing through the hot air passage 11 to the amount of the air passing through the bypass passage 13 can be adjusted in response to the opening or the position of the first air mix door 10. The hot air passage 12 and the bypass passage 13 are joined at a main air mix chamber 14 where the airs passed through these passages 13 are mixed up to control the temperature of air to be discharged or blown-off from the duct 2 at a desired value. The temperature controlled air is discharged into a front-seat part of the vehicle passenger compartment (not shown) through a front upper or vent outlet 15, a front lower or heat outlet 16, and a defroster outlet 17. A door 18a selects the upper outlet 15 or the lower outlet 16 whereas a door 18b is operable to open or block the defroster outlet 17.

The air conditioner system also comprises a rear-seat blower unit 19 including a rear-seat duct 20 and a rear-seat blower 21 for forcing air through the duct 20. The rear-seat duct 20 includes a rear-seat air mix chamber 22 disposed upstream of the blower 21. The air mix chamber 22, in the illustrated embodiment, communicates with the main duct 2 through first to third connecting passages 23a–23c. The first connecting passage 23a has an inlet opening to the cool air passage 8 provided between the evaporator 7 and the heater core 9. The second and third connecting passages 23b, 23c have inlets, respectively, opening to the main duct 2 downstream of the heater core 9. Stated more specifically, the inlet of the second connecting passage 23b opens to an end portion of the hot air passage 12 adjacent to the main air mix chamber 14 whereas the inlet of the third connecting passage 23c opens to a position immediately downstream of the main air mix chamber 14.

The main air mix chamber 14 and the rear-seat air mix chamber 22 are held in communication with each other by the third connecting passage 23c so that the temperature of the air passing through the third connecting passage 23c can be utilized as a reference temperature of the air blown-off into the rear-seat part of the passenger compartment.

A second air mix door 24 is disposed in the rear-seat air mix chamber 22 adjacent to the outlets of the first and second connecting passages 23a, 23b so that in accordance with the opening or the position of the door 24, the ratio between the amount of air entering the air mix chamber 22 from the first connecting passage 23a, and the amount of air entering the air mix chamber 22 from the second connecting passage 23b can be adjusted. Disposed between the air mix chamber 22 and the blower 21 is a rear-seat shutter 25 which is adapted to be moved from an open position to a closing position, thereby preventing air to flow from the front-seat air conditioner unit 1 to the rear-seat part on condition that there is no passenger in the rear-seat. The shutter 25 is operated by a suitable actuator driven by an output signal from a passenger sensor (neither shown).

The rear-seat duct 20 is bifurcated into two branch duct portions at a position downstream of the blower 21. One of the branch duct portions has a central vent outlet 27 opening to the rear-seat part of the passenger compartment. The other branch duct portion is further branched into left and right heat outlets 28a, 28b. A door 26 is provided to select either the vent port 27 or the heat outlets 28a, 28b.

Figure 2:
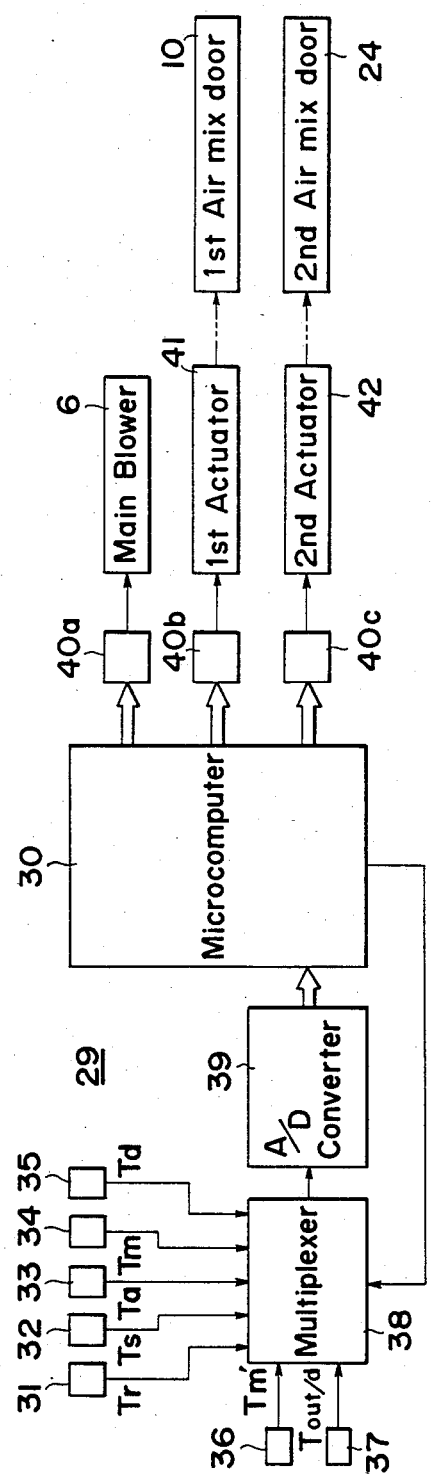
FIG. 2 is a schematic block diagram of an electric control unit embodied in the system shown in FIG. 1.

FIG. 2 shows an electric control unit 29 for controlling the main blower 6, the first air mix door 10 and the second air mix door 24. The electric control unit 29 comprises a microcomputer 30 of the type known per se, including a central processing unit (CPU), a random access memory (RAM), a read only memory (ROM) and input and output ports (I/O). Numeral 31 designates an inside temperature sensor for detecting the temperature Tr inside the passenger compartment, 32 a radiant-heat sensor for detecting the light quantity Ts of the sun incident to the vehicle, 33 an outside temperature sensor for detecting the temperature Ta outside the passenger compartment, 34 a front-seat mode sensor for detecting the temperature Tm of the cool air passed through the evaporator 7 (FIG. 1), 35 a front-seat temperature setting means for setting a desired air temperature Td in the front-seat part, 36 a rear-seat mode sensor for detecting the temperature Tm' of the air sent by the blower 21 (FIG. 1), and 37 a rear-seat temperature setting means for setting a desired blown-off air temperature Tout/d in the rear-seat part. A multiplexer 38 is responsive to a selection signal from the microcomputer 30 to sequentially deliver to an A/D converter 39 the analog signals from the sensors 31–34 and 36 and the temperature setting means 35, 37. The A/D converter 39 converts analog signals from the multiplexer 38 into digital signals and delivers the digital signals to the microcomputer 30. In accordance with a predetermined program, the microcomputer 30 computes so as to determine control signals which are supplied through drivers 40a–40c to the main blower 6, a first actuator 41 for moving and adjusting the position of the first air mix door 10, and a second actuator 42 for moving and adjusting the position of the second air mix door 24.

The operation of the microcomputer 30 is described below with reference to the flow chart shown in FIG. 3.

When a main switch is closed, the microcomputer 30 is started to proceed the program from a first step 43. In the next step 44, the CPU is clear up or reset and then the computation is started in a step 45. In the step 45, the selection signal is delivered to the multiplexer 38 whereupon various signals indicative of the temperatures Tr, Ta, Tm and Td and the quantity Ts are inputted into the microcomputer 30, a front-seat representative signal T is computed in accordance with the following equation.

$$T = (Tr-25) + K_1(Ts-25) + K_2(Ta-25) + K_3(Tm-Tmo) - K_4(Td-25) \quad (1)$$

where $K_1$–$K_4$ are gains of the respective sensors or setters and Kmo is a reference value of the front-seat mode sensor 37. In the subsequent steps 46, 47, a first air mix door control signal and a main blower control signal are computed with respect to the representative signal T so as to bring the r.p.m. of the blower 6 and the position of the first air mix door 10 near to those values (FIG. 4) stored in the ROM. These control signals are sent to the driver circuits 40a, 40b for adjusting the r.p.m. of the blower 6 and the position of the first air mix door 10.

In the next step 48, the selection signal is delivered to the multiplexer 38 whereupon signals indicative of the temperatures Tout/d and Tm' are inputted to the microcomputer 30 which in turn computes a desired value of the temperature of blown-off air to the rear-seat part on the basis of the input signals. The following equation is used for this computation.

$$T_F = Tm + K_5 \theta \quad (2)$$

Then, a rear-seat representative signal S is computed in accordance with the following equation.

$$S = K_6(Tm' - Tout/d) + K_7(T_F - Tout/d) + C \quad (3)$$

where $K_5$–$K_7$ and C are constants and $\theta$ is the opening amount of the first air mix door 10. The first term of this equation indicates the difference between the temperature of the air blown into the rear-seat part and the preset blown-off air temperature whereas the second term indicates the difference between the temperature of the air flowing from the main air mix chamber 14 through the third connecting passage 23c into the rear-seat air mix chamber 22 and the preset blown-off air temperature. Thus, the representative signal S indicates the amount of thermal load of the rear-seat part. In case the third connecting passage 23 is omitted, the second term of the equation (2) should be deleted.

Then the computation proceeds to a step 49 wherein a control signal is determined with respect to the signal S obtained by the equation (3) so as to bring the position of the second air mix door 24 near to the performance (FIG. 5) stored in the ROM. The control signal is sent to the driver circuit 40c for adjusting the opening of the second air mix door 24. At the end of the step 49 for opening amount of the second air mix door 24, the computation is returned to the step 45 and the similar computational operations as previously mentioned are repeated.

Figure 5:
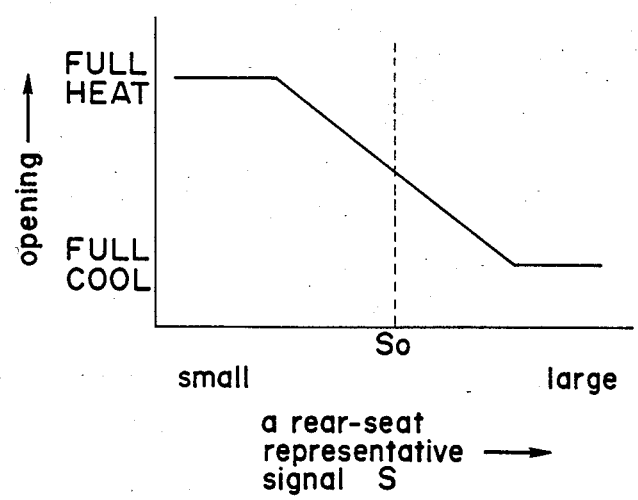
FIG. 5 is a diagram showing performance of a second air mix door with respect to a rear-seat representative signal S.

Now assuming that the thermal loads in the front- and rear-seat parts are relatively small, the representative signals T and S have values To and So, respectively, shown by broken lines in FIGS. 4 and 5. In such condition, the main blower 6 rotates at a low speed, the first air mix door 10 is slightly displaced from the central position toward the cool side, and the second air mix door 24 is located in the central position. Thus, in the front air conditioner unit 1, air sucked by the main blower 6 is cooled as it passes through the evaporator 7. A part of the cooled air is then heated as it passes through a heater core 9 and then flows through the hot air passage 12. The remainder of the cool air flows through the bypass passage 13 into the main air mix chamber 14 where the heated air and the cool air are mixed up with each other to control the temperature at a desired value. The temperature controlled air is finally blown into the front-seat part of the passenger compartment from one or more of the outlets 15–17 selected by the doors 18a, 18b.

In the rear-seat blower unit 19 with the second air mix door 24 located substantially at the central position, the airs are drawn from the first to third connecting pasages 23a–23c into the rear-seat air mix chamber 22 where they are mixed up to bring the air temperature to a desired value. The temperature controlled air is finally blown into the rear-seat part from the outlet 27 or the outlets 28a, 28b depending on the position of the door 26.

When the above condition is varied as the temperature T out/d of the rear-seat blown-off air is varied by the temperature setting means 37 or as the temperature of the blown-off air from the front-seat air conditioner unit 1 varies, the electric control unit 29 computes a rear-seat representative signal S of a different value and sends the signal S to the second actuator 42. The actuator 42 actuates the second air mix door 24 to vary the opening amount of the latter, thereby adjusting the proportion of the cooled air and the heated air in the rear-seat air mix chamber 22 such that the temperature of the air blown into the rear-seat part of the passenger compartment approaches the desired value. In other words, when the preset blown-off air temperature T out/d decreases or when the temperatures Tm', $T_F$ increase, the rear-seat representative signal S increases in value whereupon the second air mix door 24 is turned to the cool side to enlarge the opening area of the first connecting passage 23a, thereby increasing the amount of cooled air flowing from the first connecting passage 23a, at the same time, decreasing the amount of the heated air flowing from the second connecting passage 23b. On the other hand, the signal S decreases in value as the preset blown-off air temperature increases or as the temperatures Tm', $T_F$ increase, causing the air mix door 24 to move toward the heat side to enlarge the opening area of the second connecting passage 23b. Thus, the amount of the cooled air from the first connecting passage 23a decreases whereas the amount of the heated air from the second connecting passage 23b increases.

Figure 7:
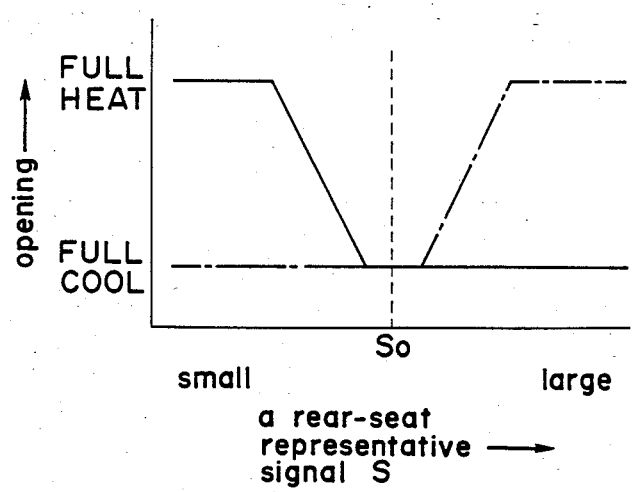
FIG. 7 is a diagram showing performance of the third and fourth air mix doors of FIG. 6 with repsect to a rear-seat representative signal S.
Figure 6:
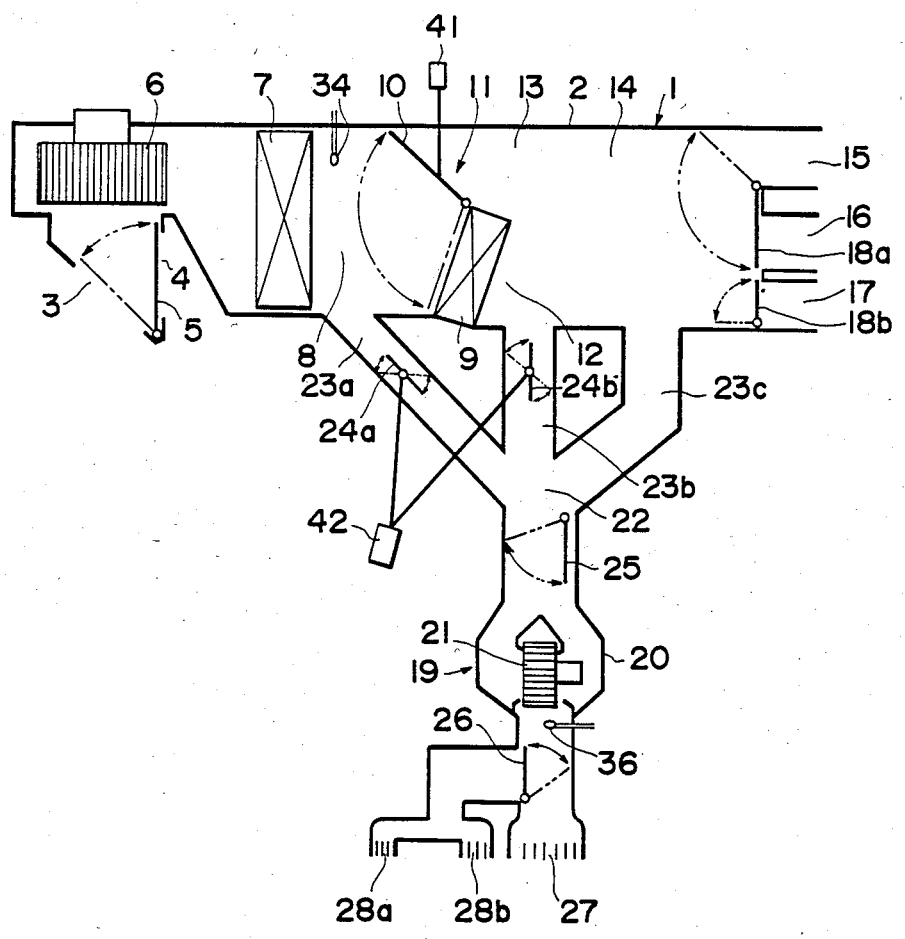
FIG. 6 is a schematic view of an air conditioner system according to another embodiment, the system having a third and fourth air mix door.

A modified air conditioner system shown in FIG. 6 is substantially the same as the system shown in FIG. 1 with the exception that third and fourth air mix doors 24a, 24b are disposed in the first and second connecting passages 23a, 23b, respectively. The doors 24a, 24b are operatively connected to and controlled by an actuator 42 to perform opening and closing operation in symmetric manner with respect to the reference value, as shown in FIG. 7. The operation of this system is substantially the same as the system of FIG. 1 and no description is needed.

Obviously, many modifications and variations of the present invention are possible in the light of the above teachings. It is therefore to be understood that within the scope of the appended claims, the invention may be practiced otherwise than as specifically described.

What is claimed is:

1. An air conditioner system for a vehicle including a passenger compartment having a front-seat part and a rear-seat part, said air conditioner system comprising;
    (a) a front-seat air conditioner unit including a main duct opening at one end thereof to the front-seat part, and means disposed in said main duct for adjusting the amount of heat exchange;
    (b) a rear-seat blower unit including a duct opening at one end thereof to the rear-seat part, and an air mix chamber defined in said duct remotely from said one end thereof;
    (c) at least two connecting passages connecting said air mix chamber with said main ducts at portions thereof located, respectively, upstream and downstream of said heat exchange amount adjusting means;
    (d) at least one air mix door disposed upstream of said air mix chamber and movable for adjusting the proportion of air introduced into said air mix chamber through said connecting passages; and
    (e) an electric control unit operatively connected with said air mix door for controlling the position of the latter, said electric control unit including
        (1) temperature setting means for presetting the temperature of air to be blown into the rear-seat part,
        (2) a sensor for detecting the temperature of air passing through said duct,
        (3) computing means for computing a control signal on the basis of the difference between the preset temperature and the detected temperature and
        (4) an actuator operatively connected to said air mix door and responsive to said control signal to actuate said air mix door.

2. An air conditioner system according to claim 1, said front-seat air conditioner unit further including an evaporator disposed in said main duct upstream of said heat exchange amount adjusting means for cooling air passing therethrough, said heat exchange amount adjusting means being composed of a heater core and a main air mix door provided in front of said heater core, said main duct having a cool air passage defined between said evaporator and said heat exchange amount adjusting means, a main air mix chamber defined downstream of said heat exchange amount adjusting means, a hot air passage extending from said heater core and blending into said main air mix chamber, and a bypass passage bypassing said heater core, extending parallel to said hot air passage and blending into said main air mix chamber, one of said connecting passages having an inlet opening to said cool air passage, the other connecting passage having an inlet opening to said hot air passage.

3. An air conditioner system according to claim 2, each of said connecting passages having an outlet opening to said air mix chamber, said air mix door being disposed adjacent to said outlets of said connecting passages.

4. An air conditioner system according to claim 2, said air mix door being disposed in each of said connecting passages.

5. An air conditioned system according to claim 2, including a further connecting passage having an inlet opening to said main air mix chamber and an outlet opening to said air mix chamber.

6. An air conditioner system according to claim 1, including a door disposed in said duct of said rear-seat blower unit and operative to block air flow toward the rear-seat part.

7. An air conditioner system according to claim 1, including a blower disposed in said duct of said rear-seat blower unit downstream of said air mix chamber, for forcing air through said duct.

* * * * *